UNITED STATES PATENT OFFICE.

LAWRENCE E. BARRINGER, OF SCHENECTADY, NEW YORK, ASSIGNOR TO GENERAL ELECTRIC COMPANY, A CORPORATION OF NEW YORK.

INSULATING COMPOUND.

1,009,630.     Specification of Letters Patent.     Patented Nov. 21, 1911.

No Drawing.     Application filed August 16, 1905. Serial No. 274,409.

*To all whom it may concern:*

Be it known that I, LAWRENCE E. BARRINGER, a citizen of the United States, residing at Schenectady, in the county of Schenectady and State of New York, have invented certain new and useful Improvements in Insulating Compounds, of which the following is a specification.

This invention relates to the manufacture of insulators and insulating material and while directed more particularly to the manufacture of a material having a high electrical resistance, has also for its object the production of material having power to resist heat, moisture and other influence which are likely to occur in the practical use of an insulating material.

I use for the basis of my improved product a fibrous resisting material such as asbestos or slag wool, and I form my improved product by mixing with this material suitable compounds which while inert with respect to each other under atmospheric conditions will nevertheless combine when properly treated to form a suitable binding material for the asbestos fiber, yielding a product having a high insulation power and capable of resisting destruction by heat up to temperatures much higher than that at which asbestos itself disintegrates.

I find that my improved product can be drilled and machined much like ordinary soap-stone, and can therefore be worked into a great variety of forms which would be difficult to secure by molding.

In carrying out my invention, I mix with the asbestos or other fibrous material flint or silica a certain quantity of hydrate of alkaline-earth metal such as calcium hydrate. The exact proportions may be varied through a considerable range, but I find that for lamp socket rings and other small objects a proportion of 40 per cent. asbestos, 38 per cent. flint and 22 per cent. calcium hydrate gives very satisfactory results. It is, of course, to be understood that the flint and calcium hydrate are finely divided to make a dense, machinable product. It will be observed that by this proportion the percentage of silicate formed is in excess of uncombined silica, the latter acting as an inert filler. The large amount of silicate gives the product its strength, high density and other properties valuable in an insulator. The particular proportions will be governed, of course, by the use for which the material is intended and the strength and toughness required. These ingredients after being thoroughly mixed are moistened with water and molded into the desired shape under a pressure sufficient to give a densely compressed body. This body is then placed in a closed chamber and treated with steam under pressure. The steam converts the calcium hydrate and silica into a hydrous silicate of calcium which forms a strong bond for the asbestos fiber. Varying steam pressures may be used and the length of time during which the treatment should continue depends more or less on the pressure utilized and the size of the object treated, though for small articles a pressure of 150 pounds per square inch continued for five hours has been found entirely satisfactory. The temperature at this pressure is about 181° C.

In carrying out my invention, I find that I can readily combine the calcium hydrate and silica by the process above described without the use of any fluxing re-agent and without utilizing any salt or compound other than those described. If desired, however, certain well known coloring oxides may be added during the process of manufacture to color the mass. The product is very hard and stone-like, dense and capable of being pressed with smooth surfaces, which it retains during the hardening treatment.

I consider it an important feature of my invention that all the solid chemical components are in the mixture when it is pressed and formed into shape and the only subsequent step consists in the steam treatment to bring about the proper chemical combinations. By thus producing the stone-like hydrous silicate of calcium "*in situ*" with respect to the asbestos fiber, I find that the fibers are very tightly bound into a compact mass or in other words are knit together by the crystals which grow in the interstices of the mass, thus uniting the entire body into one compact unit and giving the material great strength and toughness.

As a substitute for the calcium hydrate used as above described, I have found that powdered brucite gives good results. This compound is mineral magnesium hydrate, $MgOH_2O$. Various proportions of brucite and flint or silica may be used, but I have found that a satisfactory proportion consists of forty parts of brucite to sixty parts of flint. In using brucite as a substitute for calcium hydrate I may employ substantially the same steam pressure as described above and the hard, stone-like hydrous silicate of magnesium may be formed in the pores of the fibrous material, or in solid blocks of any desired shape. In place of brucite, $MgOH_2O$, I may use magnesium oxid, $MgO$, as I find that this compound when undergoing the steam treatment above described becomes hydrated and then unites with the silica so that the resulting product is substantially the same as when brucite is used, and furthermore is obtained at a much less cost as magnesium oxid is much cheaper than brucite.

What I claim as new, and desire to secure by Letters Patent of the United States, is,—

1. As a composition of matter, a machineable, stone-like insulating material consisting principally of asbestos and a silicate of an alkaline earth metal, formed by steam treatment under pressure, said silicate being in excess of either of its constituents which may be present in an uncombined state.

2. As a composition of matter, a dense, stone-like, machineable insulating material containing fibrous material and binder of hydrated calcium silicate, formed by steam treatment under pressure, said binder being in excess of any free lime or silica which may be present.

3. As a composition of matter, a molded insulating material, all of the constituents of which are insoluble in water, said material containing asbestos and a binder of hydrated calcium silicate, said silicate being in excess of either of its constituents which may be present in an uncombined state.

4. As a composition of matter, a tough, stone-like material of high insulating properties, comprising a densely compressed mass consisting of refractory fiber intimately associated with a silicate of an alkaline-earth metal with which is associated some excess of an ingredient of said silicate in amounts less than the silicate itself, said ingredient being insoluble in water.

In witness whereof, I have hereunto set my hand this 15th day of August, 1905.

LAWRENCE E. BARRINGER.

Witnesses:
BENJAMIN B. HULL,
HELEN ORFORD.